(12) United States Patent
Li et al.

(10) Patent No.: US 12,315,096 B2
(45) Date of Patent: May 27, 2025

(54) INTERACTION METHOD AND APPARATUS, DEVICE AND MEDIUM

(71) Applicant: Beijing Youzhuju Network Technology Co., Ltd., Beijing (CN)

(72) Inventors: Zhe Li, Beijing (CN); Hao Liu, Beijing (CN); Kequan Fan, Beijing (CN); Longfei Mu, Beijing (CN); Peng Xiang, Beijing (CN); Haiyang Cao, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/792,547

(22) Filed: Aug. 1, 2024

(65) Prior Publication Data
US 2024/0386683 A1 Nov. 21, 2024

Related U.S. Application Data

(63) Continuation of application No. PCT/CN2023/090292, filed on Apr. 24, 2023.

(30) Foreign Application Priority Data

Apr. 29, 2022 (CN) .......................... 202210474070.5

(51) Int. Cl.
*G06T 19/00* (2011.01)
*G06T 11/60* (2006.01)
*G06T 19/20* (2011.01)

(52) U.S. Cl.
CPC ............ *G06T 19/006* (2013.01); *G06T 11/60* (2013.01); *G06T 19/20* (2013.01); *G06T 2200/24* (2013.01); *G06T 2219/2012* (2013.01); *G06T 2219/2016* (2013.01); *G06T 2219/2024* (2013.01)

(58) Field of Classification Search
CPC .............................. G06T 11/60; G06T 19/006
See application file for complete search history.

(56) References Cited

U.S. PATENT DOCUMENTS

2013/0286206 A1* 10/2013 Ozaki ................... G06T 19/006
                                                              348/148
2018/0108165 A1*  4/2018 Shi ......................... G06N 3/084

FOREIGN PATENT DOCUMENTS

| CN | 110418185 B | 8/2021 |
| CN | 113298602 A | 8/2021 |
| CN | 114185466 A | 3/2022 |
| CN | 114266621 A | 4/2022 |

(Continued)

OTHER PUBLICATIONS

Borges et al., A Virtual Makeup Augmented Reality System, 2019 21st Symposium on Virtual and Augmented Reality, 2019, pp. 34-42 (Year: 2019).*

(Continued)

*Primary Examiner* — Charles Tseng

(57) ABSTRACT

The embodiments of the present disclosure provide an interaction method and apparatus, device and medium, wherein the interaction method includes: in response to a trigger operation on a target interaction anchor on a video page, obtaining an image to be processed and a material of a target item associated with the target interaction anchor; and generating a target image based on the material of the target item and the image to be processed.

20 Claims, 9 Drawing Sheets

(56) References Cited

FOREIGN PATENT DOCUMENTS

| KR | 2021-0083551 A | 7/2021 |
|----|----------------|--------|
| WO | 2022/039450 A1 | 2/2022 |

OTHER PUBLICATIONS

Chiu et al., Empirical Study of the Usability and Interactivity of an Augmented-Reality Dressing Mirror, Microsystem Technologies, vol. 24, 2018, pp. 4399-4413 (Year: 2018).*
International Search Report received for PCT Patent Application No. PCT/CN2023/090292, mailed on Jun. 28, 2023, 6 pages (2 pages of English Translation and 4 pages of Original Document).

* cited by examiner

INTERACTION METHOD AND APPARATUS, DEVICE AND MEDIUM

CROSS-REFERENCE TO RELATED APPLICATIONS

This application is based on and claims the benefit of priority to the Chinese patent application No. 202210474070.5 filed on Apr. 29, 2022, which is hereby incorporated by reference in its entirety into the present application.

TECHNICAL FIELD

The present disclosure relates to the field of interaction, in particular to an interaction method and apparatus, a device, and a medium.

BACKGROUND

A virtual experience generally can be an immersive interactive experience such as virtual makeup or virtual wearing achieved by using Augmented Reality (AR) technology for items such as cosmetics, clothing, etc. This interactive approach allows users to better choose products that suit them.

In related technologies, an interactive entrance for a virtual experience of a product is mostly set in a product introduction page. A user need to take a screenshot and search to find the product introduction page in order to access the virtual experience.

SUMMARY

According to some embodiments of the present disclosure, an interaction method is provided, comprising:
in response to a trigger operation on a target interaction anchor on a video page, obtaining an image to be processed and a material of a target item associated with the target interaction anchor; and
generating a target image based on the material of the target item and the image to be processed.

According to other embodiments of the present disclosure, an interaction apparatus is also provided, comprising:
a triggering module configured to in response to a trigger operation on a target interaction anchor on a video page, obtain an image to be processed and a material of a target item associated with the target interaction anchor; and
an image module configured to generate a target image based on the material of the target item and the image to be processed.

According to further embodiments of the present disclosure, an electronic device is also provided, wherein the electronic device comprises: a processor; a memory for storing executable instructions of the processor; wherein the processor is configured to read the executable instructions from the memory and executing the executable instructions to implement the interaction method as provided in any of the embodiments of the present disclosure.

According to further embodiments of the present disclosure, a non-transitory computer-readable storage medium is also provided, wherein the storage medium stores a computer program, which when executed by a processer, cause the processer to implement the interaction method as provided in any of the embodiments of the present disclosure.

BRIEF DESCRIPTION OF THE DRAWINGS

By combining the accompanying drawings and referring to the following Detailed Description, the above and other features, advantages, and aspects of each embodiment of the present disclosure will become more apparent. Throughout the accompanying drawings, the same or similar drawing reference signs indicate the same or similar elements. It should be understood that the accompanying drawings are illustrative, and elements may not necessarily be drawn to scale relative to the originals.

DETAILED DESCRIPTION

A more detailed description of the embodiments of the present disclosure will be provided below with reference to the accompanying drawings. Although certain embodiments of the present disclosure are shown in the accompanying drawings, it should be understood that the present disclosure can be realized in various forms and should not be construed as limited to the embodiments described herein. Instead, these embodiments are provided for a more thorough and complete understanding of the present disclosure. It should be understood that the accompanying drawings and embodiments of the present disclosure are for illustrative purposes only rather than limiting the protection scope of the present disclosure.

It should be understood that various steps recorded in the embodiments of the disclosed methods can be executed in different orders and/or in parallel. In addition, the method implementation can comprise additional steps and/or omit executing the shown steps. The scope of the present disclosure is not limited in this regard.

The term "comprising" and its variations used herein are nonexclusive inclusion, meaning "comprising but not limited to". The term "based on" means "at least partially based on". The term "one embodiment" means "at least one embodiment"; the term "another embodiment" means "at least one other embodiment"; the term "some embodiments" means "at least some embodiments". The relevant definitions of other terms will be provided in the following description.

It should be noted that the concepts such as "first", "second", etc., mentioned in the present disclosure are only used to distinguish different devices, modules or units rather than to limit the order or interdependence of the functions performed by these devices, modules or units.

It should be noted that the modifications of "one" and "multiple" mentioned in the present disclosure are illustrative rather than restrictive, and those skilled in the art should understand that unless otherwise explicitly stated in the context, they should be understood as "one or more".

Names of messages or information exchanged between multiple devices in the implementations of the present disclosure are for illustrative purposes only rather than limiting the scope of these messages or information.

The inventors found that a cost for searching an interactive entrance of a virtual experience in related technologies is relatively high and an efficiency for searching the interactive entrance is relatively low, which adversely affects a user' interactive experience effect. In order to solve the problem of the virtual experience in the related technologies, embodiments of the present disclosure provide an interaction method which will be introduced below in conjunction with specific embodiments.

Figure 1:
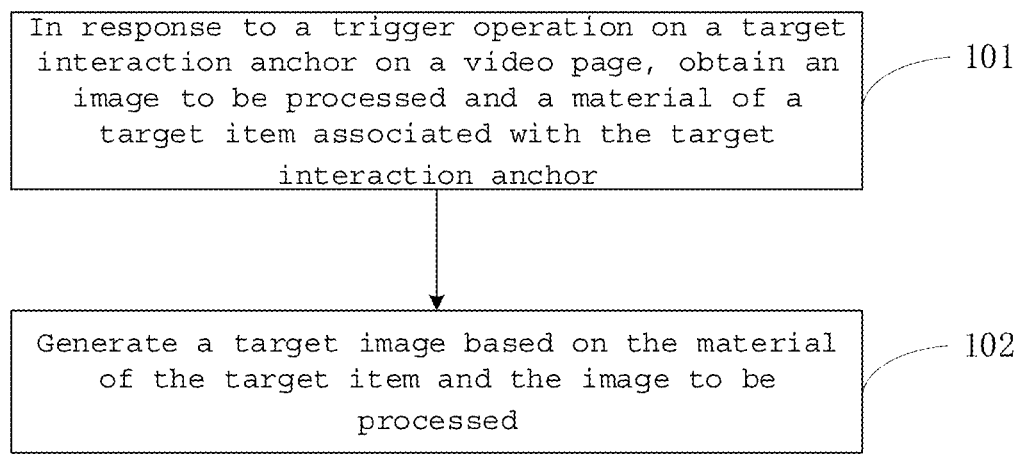
FIG. 1 is a flowchart of an interaction method provided in some embodiments of the present disclosure.

FIG. 1 is a flowchart of an interaction method provided in some embodiments of the present disclosure, which can be executed by an interaction apparatus, wherein the interaction apparatus can be realized using software and/or hardware and can generally be integrated into an electronic device. As shown in FIG. 1, the method comprises: steps 101 to 102.

In step 101, in response to a trigger operation on a target interaction anchor on a video page, an image to be processed and a material of a target item associated with the target interaction anchor are obtained.

The video page can be a page, which can play a video, in a client. For example, the video page can be a video preview page or a video playing page, etc., with no specific restrictions, and the video page can comprise a video and at least one interaction anchor associated with the video. There are no restrictions on a type of the video, for example, it can be a short or long video. The at least one interaction anchor can be understood as at least one quick entrance associated with the video for providing an interactive experience, which can quickly lead a user to a designated interaction position. The embodiments of the present disclosure do not limit a display style of the at least one interaction anchor, and the above-mentioned target interaction anchor can be an anchor corresponding to a trigger operation of the user.

The image to be processed can be an image for interaction, which is related to a current user, comprising a static image or a dynamic image, with no specific restrictions. In some embodiments of the present disclosure, the image to be processed can be a real-time shot image or a local image. The target item can be an item that is bound to the target interaction anchor in advance. For example, the target item may be a lipstick, hat, etc. Each of the at least one interaction anchor can be pre-associated with at least one item. Specifically, an identification (ID) of the each of the at least one interaction anchor can be associated with an identification of the at least one item. The material can be a pre-set material element used to achieve the interactive experience, with different materials for different items. For example, when the item is lipstick, the material can be a two-dimensional sticker of lipstick and when the item is hat, the material can be a three-dimensional model of hat.

In some embodiments of the present disclosure, the client can display the video and the at least one interaction anchor of the video on the video page, and detect the trigger operation of the user; in response to the trigger operation on the target interaction anchor in the at least one interaction anchor, obtain the image to be processed and the material of the target item associated with the target interaction anchor for future use. It can be understood that the video on the above video page can be a product introduction video, and an introduced product is the target item.

In some embodiments, in response to the image to be processed being a real-time shot image, the obtaining the image to be processed can comprises: activating an interactive virtual camera associated with the target interaction anchor, and obtaining the real-time shot image through the interactive virtual camera.

The interactive virtual camera can be a camera used for an interactive virtual experience. The interactive virtual experience in some embodiments of the present disclosure can be an immersive interactive experience such as virtual makeup or virtual wearing achieved using AR technology. Each of the at least one interaction anchor can be pre-associated with an interactive virtual camera. An association in particular can be achieved by binding an identification of each of the at least one interaction anchor with an identification of the interactive virtual camera. In response to the image to be processed being the real-time shot image, the client can activate the interactive virtual camera associated with the target interaction anchor in response to a trigger operation on the target interaction anchor and obtain the real-time shot image through the interactive virtual camera.

In some embodiments, in response to the image to be processed being a local image, the obtaining the image to be processed can comprises: in response to an upload operation of the local image, obtaining the local image. In response to the image to be processed being the local image stored in the interaction apparatus, the client can obtain the local image in response to the upload operation of the user.

Figure 2:
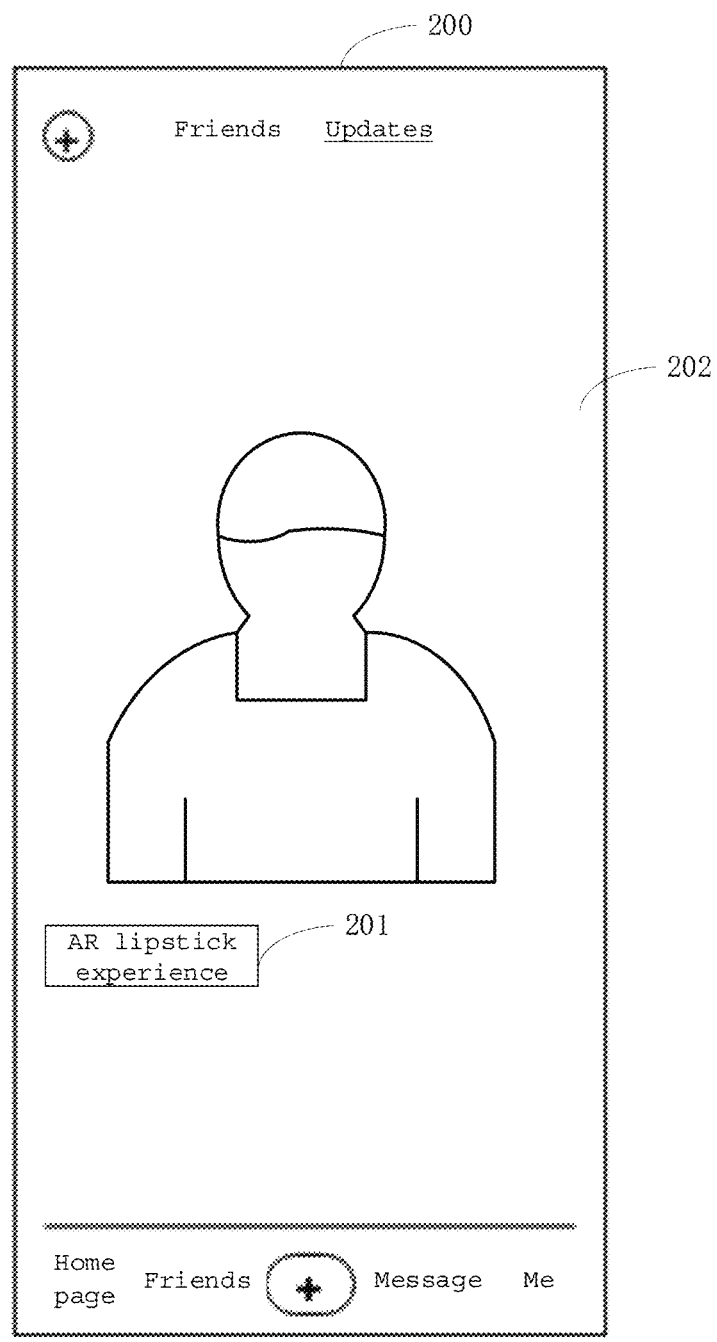
FIG. 2 is a schematic diagram of a video page provided in some embodiments of the present disclosure.

For illustration, FIG. 2 is a schematic diagram of a video page provided in some embodiments of the present disclosure. As shown in FIG. 2, a video page 200 is displayed, which can comprise a video 202 and an interaction anchor 201 associated with the video 202. A display style of the interaction anchor 201 in FIG. 2 can be a prompt information of "AR lipstick experience", which is only an example.

In step 102, a target image is generated based on the material of the target item and the image to be processed.

The target image can be understood as an image to display a specific interactive effect of adding the material of the target item to the image to be processed. For example, when the target item is lipstick, the target image can be an image after adding the color of lipstick to a mouth area of the image to be processed. The target image can be a static image or a dynamic video, with no specific restrictions.

In some embodiments of the present disclosure, after obtaining the image to be processed and the material of the target item, the interaction apparatus can combine the image to be processed with the material of the target item to obtain the target image.

In response to the target image being a dynamic video, the interaction apparatus can combine the material of the target item with the image to be processed to obtain a combined image, and store combined images at each moment for a period of time, finally through combination obtain a dynamic video, namely, the target image.

In response to the target image being a real-time shot image and the target image being a static image. The interaction apparatus can generate a real-time preview image based on the material of the target item and the image to be processed. The real-time preview image is generated based on the real-time shot image and the material of the target item; afterwards, the real-time preview image can be taken as the target image, and the target image can be displayed to the user in the interactive virtual camera.

In some embodiments, the generating a target image based on the material of the target item and the image to be processed comprises: determining a target image area in the image to be processed based on a material type of the material of the target item; and combining the material of the target item with the target image area in the image to be processed to obtain the target image.

The material type can be a type to which the material is divided. In some embodiments of the present disclosure, the material type can comprise a two-dimensional sticker and a three-dimensional model. When the material type of the material of the target item changes, the target image area in the image to be processed changes. After determining the target image area based on the material type of the material of the target item, the material of the target item can be combined with the target image area to obtain the target image.

In some embodiments, in response to the material of the target item being a two-dimensional sticker of the target item and the target image area being a portrait area, the combining the material of the target item with the target image area in the image to be processed to obtain the target image comprises: overlaying the two-dimensional sticker of the target item on the portrait area in the image to be processed to generate the target image.

The portrait area can be understood as an area where human skin is exposed, which in particular can comprise a facial area and other areas where the skin is exposed. When the material of the target item is the two-dimensional sticker, the material characterizing the target item can act on the image in a plane way, For example, materials of items such as a lipstick, an eye shadow, a blush, and so on are two-dimensional stickers. The client can overlay the two-dimensional sticker of the target item as a layer on the portrait area of the image to be processed, thus generating the target image which can then be displayed to the user to achieve an immersive interactive experience of the user for an applied item, for example, a makeup trial experience for a lipstick.

In some embodiments, in response to the material of the target item being a three-dimensional model of the target item and the target image area is a body area corresponding to the target item, and the combining the material of the target item with the target image area in the image to be processed to obtain the target image comprises: combining the three-dimensional model of the target item with the body area corresponding to the target item in the image to be processed to generate the target image, wherein the body area comprises a head area, a neck area, a limbs area, or a foot area.

The body area can be any area in the human body, and different items can correspond to different body areas. For example, a hat corresponds to the head area, shoes correspond to the feet area, and so on. When the material of the target item is a three-dimensional model (3D model), the material characterizing the target item can act on some areas of the image in a three-dimensional manner. For example, materials of items such as hats, clothes, shoes, etc., are 3D models. The client can three-dimensionally combine the 3D model of the target item with the body area corresponding to the target item in the image to be processed through the interactive virtual camera mentioned above and generate target image, and the target item can be displayed from various angles to achieve an immersive wearing experience of the user for a wearable item. For example, when the target item is a hat, the 3D model of the hat can be subjected to a processing of 3D wearing on the head area in the image to be processed, thus generating the target image of wearing a virtual hat and displaying it to the user.

Figure 3:
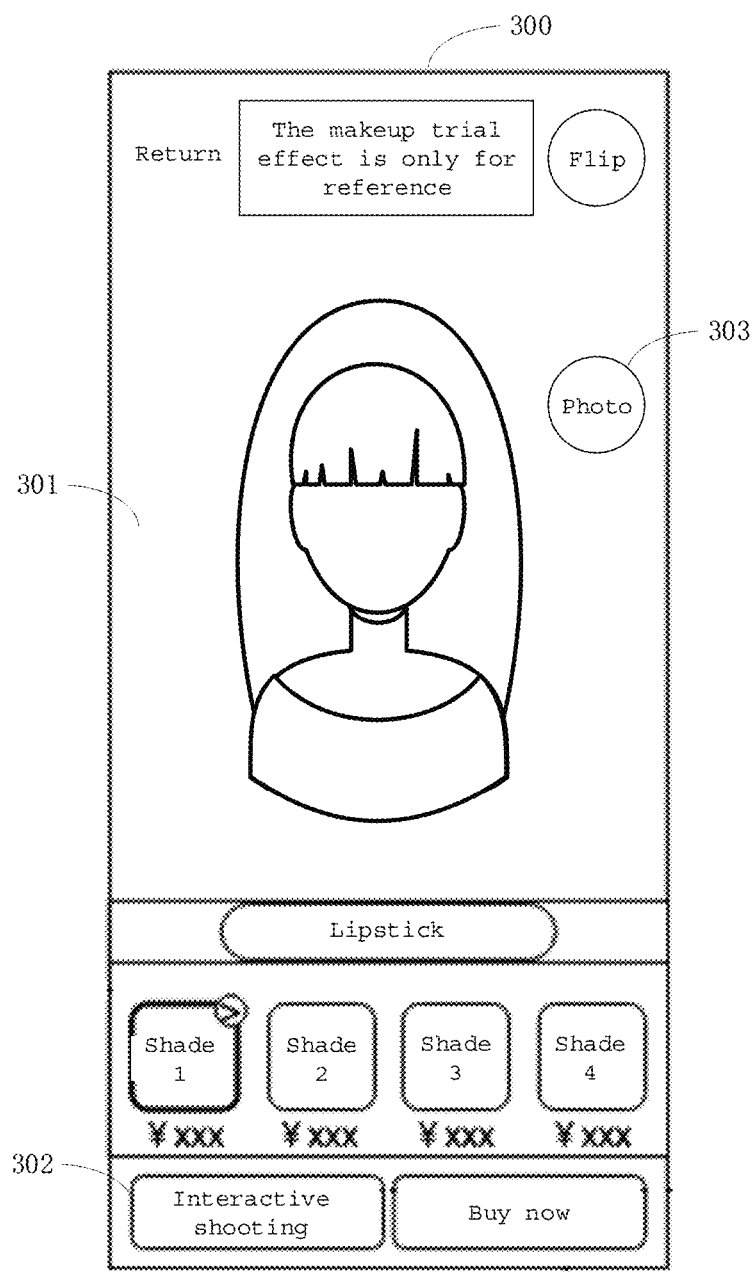
FIG. 3 is a schematic diagram of a target image provided in some embodiments of the present disclosure.

For illustration, FIG. 3 is a schematic diagram of a target image provided in some embodiments of the present disclosure. As shown in FIG. 3, an interactive experience page 300 is displayed, taking the target image being a real-time preview image as an example. The interactive experience page 300 can comprise a target image 301, which can be generated based on the real-time shot image and a material of a lipstick associated with an interaction anchor 201 after a trigger operation on the interaction anchor 201 in FIG. 2.

For example, in a scenario where a user scrolls on short videos, the client can display a short video on a video page, which is a video introducing a lipstick. The short video can comprise an interaction anchor of the lipstick. After triggering the interaction anchor of the lipstick, a user can acquire an image to be processed and a material of the lipstick, and based on the image to be processed and the material of the lipstick, a target image after a makeup trial of putting on the lipstick is generated, which is then displayed to the user or stored locally.

An interaction scheme provided in the embodiments of the present disclosure is: in response to a trigger operation on a target interaction anchor on a video page, obtaining an image to be processed and a material of a target item associated with the target interaction anchor; based on the material of the target item and the image to be processed, generating a target image. Using the above interaction scheme, by means of the trigger operation on the interaction anchor in the video page, the user can acquire the image to be processed and the material of the target item associated with the interaction anchor, and the target image with an interactive effect is generated to display. By setting the interaction anchor on the video page, the user can quickly access an entrance of an interactive experience and have the interactive experience subsequently, thus reducing search costs. Not only can the user understand item information through the video, but he/she can also quickly achieve the interactive experience of the same item on the basis of the video, thus greatly improving the interactive experience of the user.

In some embodiments, the material of the target item comprises materials of the target item under at least two attributes, and the interaction method further comprises, after generating the target image based on the material of the target item and the image to be processed: in response to an attribute switching operation of the material of the target item, generating a new target image based on a switched material of the target item and the image to be processed.

The attributes of the target item can be determined based on its specific type. For example, when the target item is a lipstick, the attributes can be lipstick shades; when the target item is a hat, the attributes can be colors. Referring to FIG. 3, in which the material of the lipstick can comprise materials of four shades in the figure. The target image 301 can be generated based on the material of the lipstick under shade 1 and the image to be processed.

Specifically, when the material of the target item comprises the materials of the target item under the at least two attributes, the client can receive the attribute switching operation on the material of the target item from a user, wherein the attribute switching operation can be a trigger operation on another attribute of the target item, and obtain the material of the target item under the another attribute corresponding to the attribute switching operation, namely, the switched material, and generate and display the new target image based on the switched material and the image to be processed.

As shown in FIG. 3, when the user performs a trigger operation on a card of shade 2, the client can receive a switching operation, obtain a material of the lipstick under shade 2, and generate a new target image based on the material of the lipstick under shade 2 and the image to be processed.

When displaying an image under interactive experience effects, the above scheme can support a user to switch different attributes of the item to display interactive experience effects of the same item under different attributes or models, helping the user choose a more suitable item and further improving the user' interactive experience effects.

Figure 4:
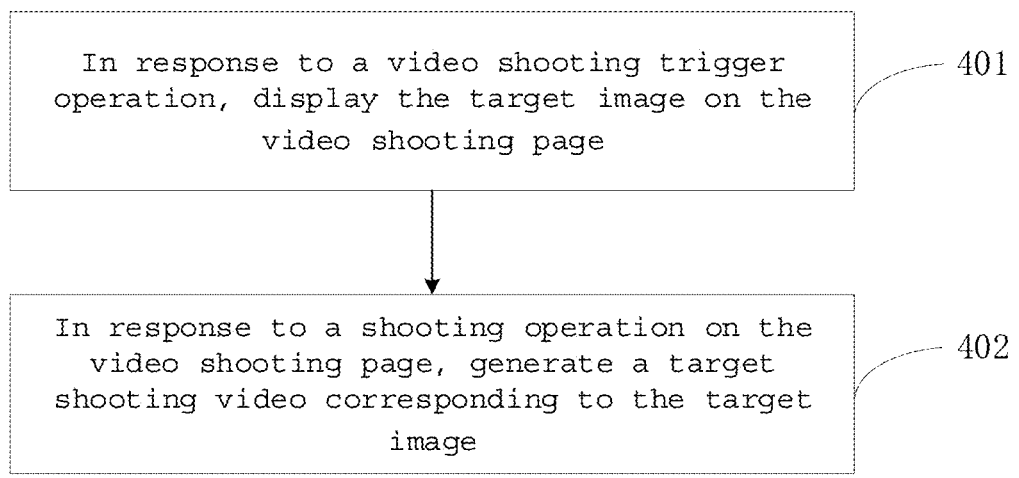
FIG. 4 is a flowchart of an interaction method provided in some other embodiments of the present disclosure.

For illustration, FIG. 4 is a flowchart of an interaction method provided in some embodiments of the present disclosure. In a feasible implementation, in response to the target image being a real-time preview image generated based on a real-time shot image, after the above step 102, the interaction method can further comprise step 401 to step 402 as follows.

In step 401, in response to a video shooting trigger operation, the target image is displayed on the video shooting page.

The video shooting trigger operation can comprise a gesture control operation (such as a click, a long press, a double click, etc.), a voice control operation, or a facial expression control operation on a video shooting control, etc., with no restrictions on it in the embodiments of the present disclosure. For example, referring to FIG. 3, a video shooting control 302 can be set on the page displaying the target image. The video shooting control 302 can comprise prompt information of "interactive shooting", whose position in FIG. 3 is only an example but can also be set at another position that do not interfere with the display of the target image. The video shooting trigger operation can be a click operation on the video shooting control 302 in FIG. 3.

Specifically, after generating the target image which is the real-time preview image based on the material of the target item and the image to be processed, the client can receive the video shooting trigger operation of the user, then jump to the video shooting page, and display the target image on the video shooting page.

Figure 5:
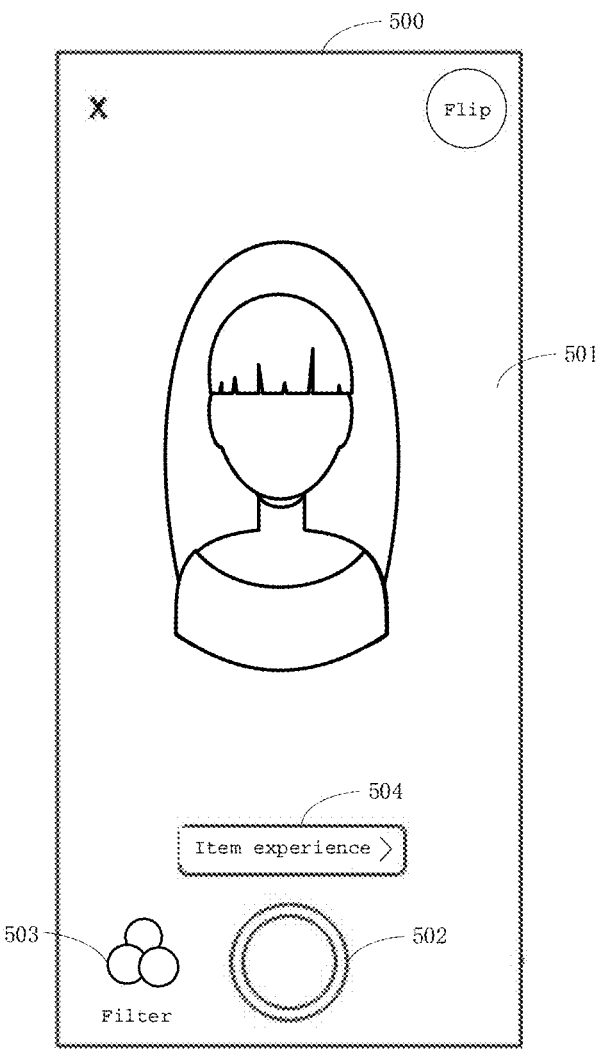
FIG. 5 is a schematic diagram of a video shooting page provided in some embodiments of the present disclosure.

For illustration, FIG. 5 is a schematic diagram of a video shooting page provided in some embodiments s of the present disclosure. As shown in FIG. 5, a video shooting page 500 is displayed, taking a real-time preview image as an example. The video shooting page 500 can comprise a real-time preview image 501 and can also comprise a control 504 for an item experience. After triggering the control 504 by a user, an interactive experience page 300 in FIG. 3 can be returned.

In step 402, in response to a shooting operation on the video shooting page, a target shooting video corresponding to the target image is generated.

The shooting operation can comprise a gesture control operation, a voice control operation, or a facial expression control operation on the shooting control, etc., with no specific restrictions. For example, referring to FIG. 5, the video shooting page 500 can also comprise a shooting control 502, and the shooting operation can be a click operation on the shooting control 502 from a user, which is only an example.

In some embodiments of the present disclosure, after displaying the target image on the video shooting page, the client can receive the shooting operation on the video shooting page from the user, capture a target image at each moment for a period of time, and finally combine them to generate the target shooting video. In response to the image to be processed being the real-time shot image, the target image may change at different moments.

In some embodiments, In response to the image to be processed being a static image of a local image, the target image can be a static image to which the material of the target item is added, or based on which a target shooting video can be generated, and since the target image remains unchanged at different moments, each frame of the target shooting video is the same.

Figure 6:
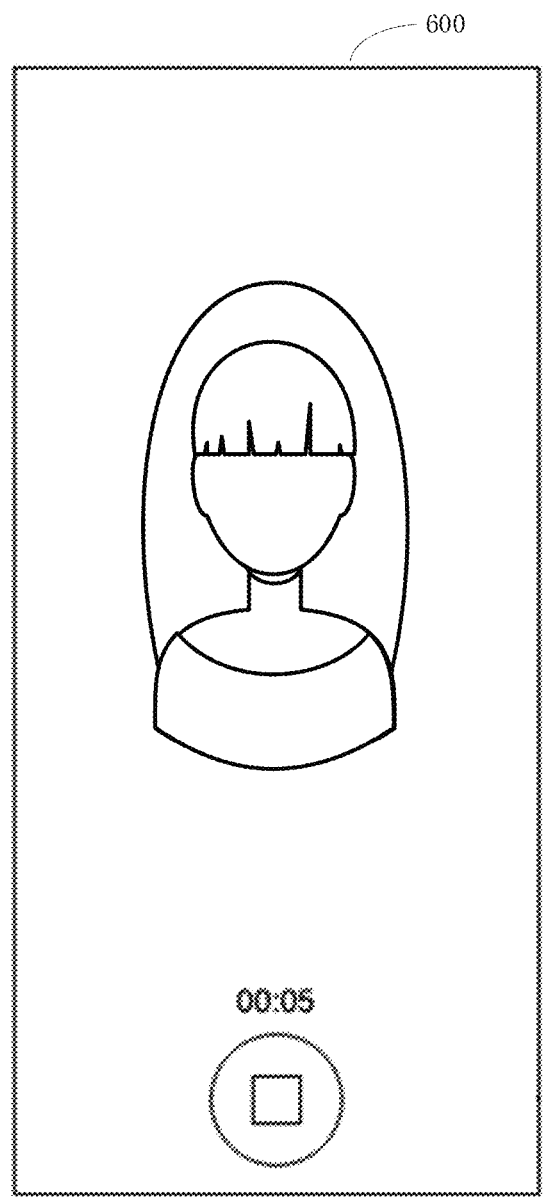
FIG. 6 is a schematic diagram of a shooting process provided in some embodiments of the present disclosure.

For illustration, FIG. 6 is a schematic diagram of a shooting process provided in some embodiments of the present disclosure. As shown in FIG. 6, a page 600 is displayed with the target image being a real-time preview image, wherein the page 600 can display the target image at the moment of 00:05 during a video shooting process.

After generating the target image under an interactive experience effect, when the target image is a static image, the above scheme can also support the user to shoot a video of the target image to obtain a video corresponding to the target image, further improving interaction diversity of the user.

In some embodiments, the interaction method can further comprise: after the above step 102, in response to a photo trigger operation, storing the target image as a photo.

The photo trigger operation can comprise a gesture control operation, a voice control operation, or a facial expression control operation on a photo control, etc., with no specific restrictions. For example, referring to FIG. 3, a photo control 303 can be set on the page displaying the target image. The photo trigger operation can be a click operation on the photo control 303 from a user, which is only an example.

In some embodiments of the present disclosure, after displaying the real-time preview image on the video shooting page, the client can receive the photo trigger operation of the user and store the target image as the photo locally. After generating the target image under an interactive experience effect, the above scheme can also support the user to store the target image so as to assist a playback of the user and further enhance the interaction diversity of the user.

In some embodiments, the video shooting page can also comprise at least one effect control corresponding to the target item. The interaction method in some embodiments of the present disclosure can further comprise: in response to the shooting operation and a trigger operation on a target effect control within the at least one effect control, adding an effect element corresponding to the target effect control in the target image during a video shooting process, and generating the target shooting video.

The at least one effect control can be understood as at least one functional control used for adding at least one effect element. Effect elements corresponding to different effect controls may be different, and the effect controls corresponding to different items may be different or the same.

Specifically, the above video shooting page can also display the at least one effect control corresponding to the target item. After the step 401, in response to the shooting operation on the video shooting page and the trigger operation on the target effect control from the user, a target image at each moment within a period of time can be captured, and the target image at each moment is added with an effect element corresponding to the target effect control, and finally all the target images are combined to generate a target shooting video.

For example, referring to FIG. 5, the video shooting page 500 also displays an effect control 503, and an effect element corresponds to the effect control is a filter. After the user triggers the effect control 503 and the video shooting control 502, a filter effect can be added to the target image during a video shooting process to generate the target shooting video corresponding to the target image. The effect control 503 in FIG. 5 is only an example, and a specific quantity and type of the effect control can be determined based on the target item.

In some embodiments, an effect element of each of the at least one effect control corresponding to the target item corresponds to one attribute of the target item, and in response to the target item corresponding to multiple effect controls, attributes of the target item corresponding to effect elements of the multiple effect controls are different, wherein the attributes of the target item comprise at least one of the following: color, size, style, and material.

The attributes of the target item can be information entries used to characterize features of the target item relevant to itself. For example, the target item is lipstick, whose attributes can comprise a lipstick color, a lipstick material, etc. Attributes corresponding to different target items are different, and in turn effect elements corresponding to different target items are also different, which in particular are set according to an actual situation. In response to the trigger operation on the target effect control from the user, the effect element corresponding to the target effect control can be determined. Adding the effect element to the target image means switching in the target image from a current attribute of the target item to a target attribute corresponding to the effect element, capturing target images for a period of time, and obtaining the target shooting video. For example, if the target item is a lipstick, which corresponds to effect elements of two effect control, namely, a first effect element and a second effect element. An attribute of the first effect element is a lipstick color—pink, and an attribute of the second effect element is a lipstick color—rose. Assuming that currently an effect element corresponding to the target effect control added to the target image is the first effect element, when the user triggers the effect control corresponding to the effect element, the effect element corresponding to the target effect control added to the target image can be changed to the second effect element. At this point, in the target image, the lipstick color of the user is switched from pink to rose.

In the above scheme, at least one effect element can be added during a video shooting process of the target image, so that the generated video comprises both an interactive experience effect and an effect, improving a display effect and flexibility of the video, and further enhancing the user's interactive experience effect. The effect elements can be associated with the attributes of the target item. By adding the effect elements, the attributes of the target item can be switched, allowing the user to be able to browse more diverse item experience effects, helping the user choose the target item and further improving the user's interactive experience effect.

In some embodiments, after the above step 102 or step 402, the interaction method can further comprise: in response to a video posting trigger operation, displaying an anchor setting control of the target image on a video posting page; in response to a setting trigger operation on the anchor setting control, adding a target interaction anchor corresponding to the target item in the target image, and obtaining an anchor video; and in response to a video posting operation, posting the anchor video.

Since the target image can also be a dynamic video, a video posting can also be performed based on the target image.

Figure 7:
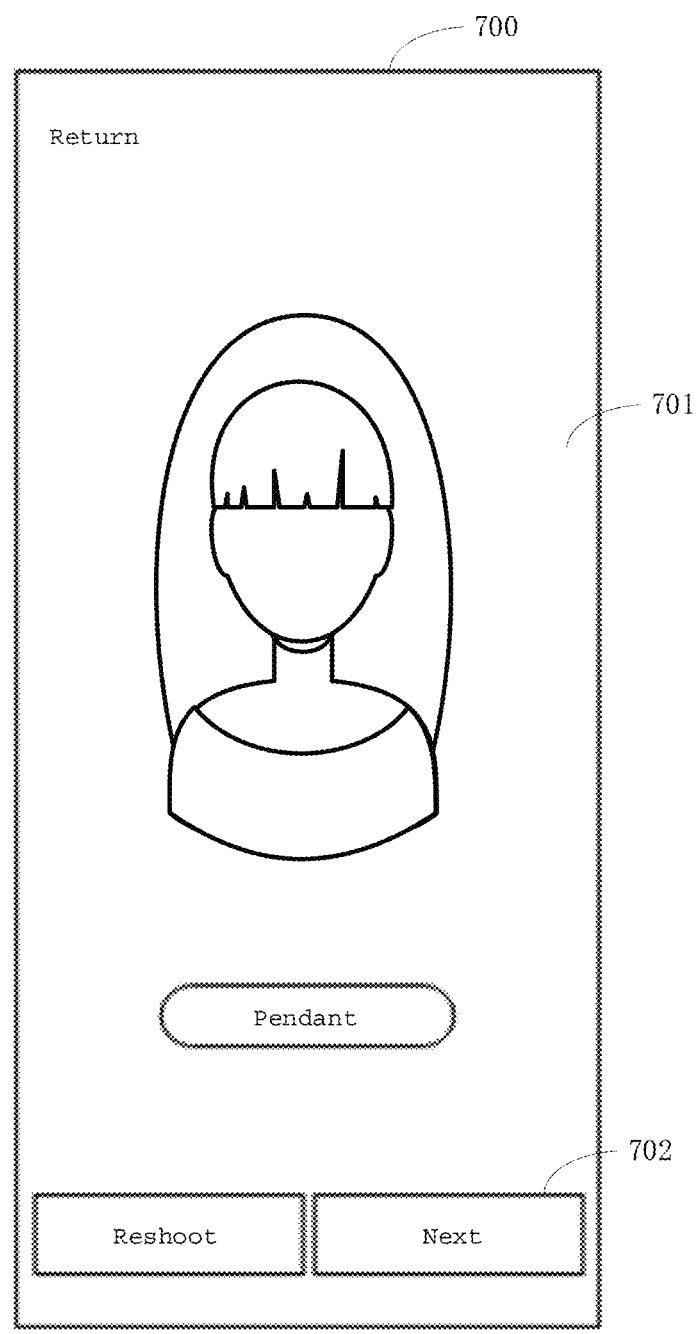
FIG. 7 is a schematic diagram of a posting preview page provided in some embodiments of the present disclosure.

The video posting trigger operation can be an activating operation used for posting video, which can comprise a gesture control operation, a voice control operation, or a facial expression control operation, etc., with no specific restrictions. For illustration, FIG. 7 is a schematic diagram of a posting preview page provided in some embodiments of the present disclosure. As shown in FIG. 7, with the target image being a real-time preview image, a posting preview page 700 after completing a video shooting based on the above FIGS. 5 and 6 is displayed. The posting preview control 702. The video posting trigger operation can be a trigger operation on the video posting control 702. The video posting control 702 comprises a prompt information of "Next". If a user is satisfied after previewing the target shooting video 701, the user can trigger the video posting control 702 for a subsequent video posting. Optionally, the posting preview page 700 can also comprise functional controls, such as a reshooting control and a pendant control. The reshooting control is used for returning to the video shooting page 500 in FIG. 5 for video shooting, and the pendant control is used for adding various types of pendants. These two functional controls are only examples.

Figure 8:
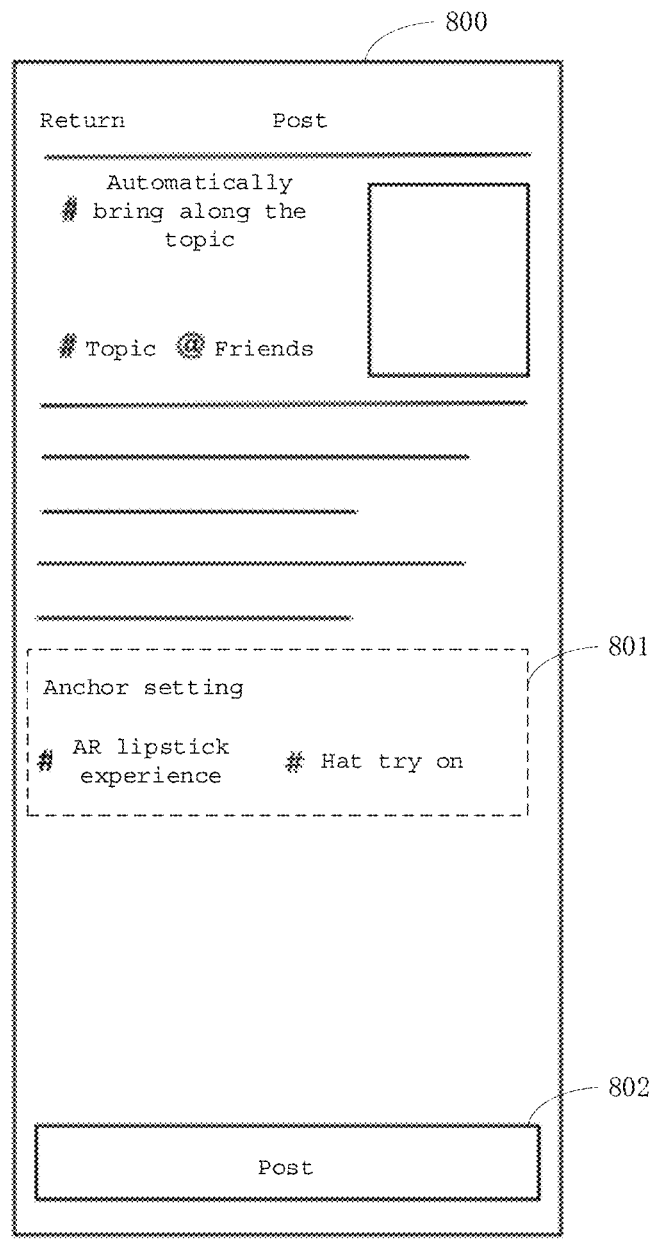
FIG. 8 is a schematic diagram of a video posting page provided in some embodiments of the present disclosure.

The video posting page can be used for setting relevant content of video posting, for example, setting a cover, a topic, a position, and an access permission for the video posting. In some embodiments of the present disclosure, an anchor setting control is added to the video posting page for setting the interaction anchor for the target shooting video. A specific style of the anchor setting control is not limited in the embodiments of the present disclosure. For illustration, FIG. 8 is a schematic diagram of a video posting page provided in some embodiments of the present disclosure. As shown in FIG. 8, a video posting page 800 is displayed, which can comprise an anchor setting control 801. The anchor setting control 801 can comprise the target interaction anchor of the above target item and another related interaction anchor. The target interaction anchor in the FIG. 8 is represented as "AR lipstick experience", and the another interaction anchor is represented as "Hat try on", which are only examples. The video posting page 800 can also comprise setting controls of a topic, a cover, etc., for setting other content of the video posting.

The video posting operation can be used for posting a video, which can comprise a gesture control operation, a voice control operation, or a facial expression control operation, etc., with no specific restrictions. For example, as shown in FIG. 8, the video posting page 800 can also comprise a posting control 802, and the video posting operation can be a trigger operation on the posting control 802.

Specifically, after generating the target shooting video, the client can receive the video posting trigger operation of the user, jump to the video posting page, and display on the video posting page the anchor setting control of the target image or target shooting video, as well as other setting controls. Afterwards, the client can receive the setting trigger operation on the anchor setting control from the user, automatically add the target interaction anchor of the target item to a target position in the target image or target shooting video, or manually add the target interaction anchor of the target item to a selected position based on the setting trigger operation, and obtain the anchor video. The target position can be a preset anchor adding position, which can be set according to an actual situation. After obtaining the anchor video, the client can receive the video posting operation of the user and post the anchor video. Optionally, the client can also in response to a video storing operation of the user, store the added anchor video locally for future use.

In some embodiments, the target interaction anchor is added to the target position in the target image or the target shooting video; the distance between the target position and the target item is less than or equal to a preset distance, or the target position is any position in a background area. The preset distance can be set according to an actual situation, for example, the preset distance can be 1 cm. When the distance between the target position and the target item is less than or equal to the preset distance, the target interaction anchor is added near the target item, allowing the user to quickly notice. The target position can also be set to any position in the background area, that is, not to interfere with content display of the target image or the target shooting video.

For example, as shown in FIG. 8, after the user triggers the anchor setting control, the target interaction anchor "AR lipstick experience" of the target item in FIG. 2 is selected and highlighted in bold. At this point, the target interaction anchor can be automatically added to the target position of the target image or the target shooting video, or a button for selecting the target position can be set in the anchor setting control (not shown in the figure). The user can manually add the target interaction anchor to the selected position by triggering this button.

Figure 9:
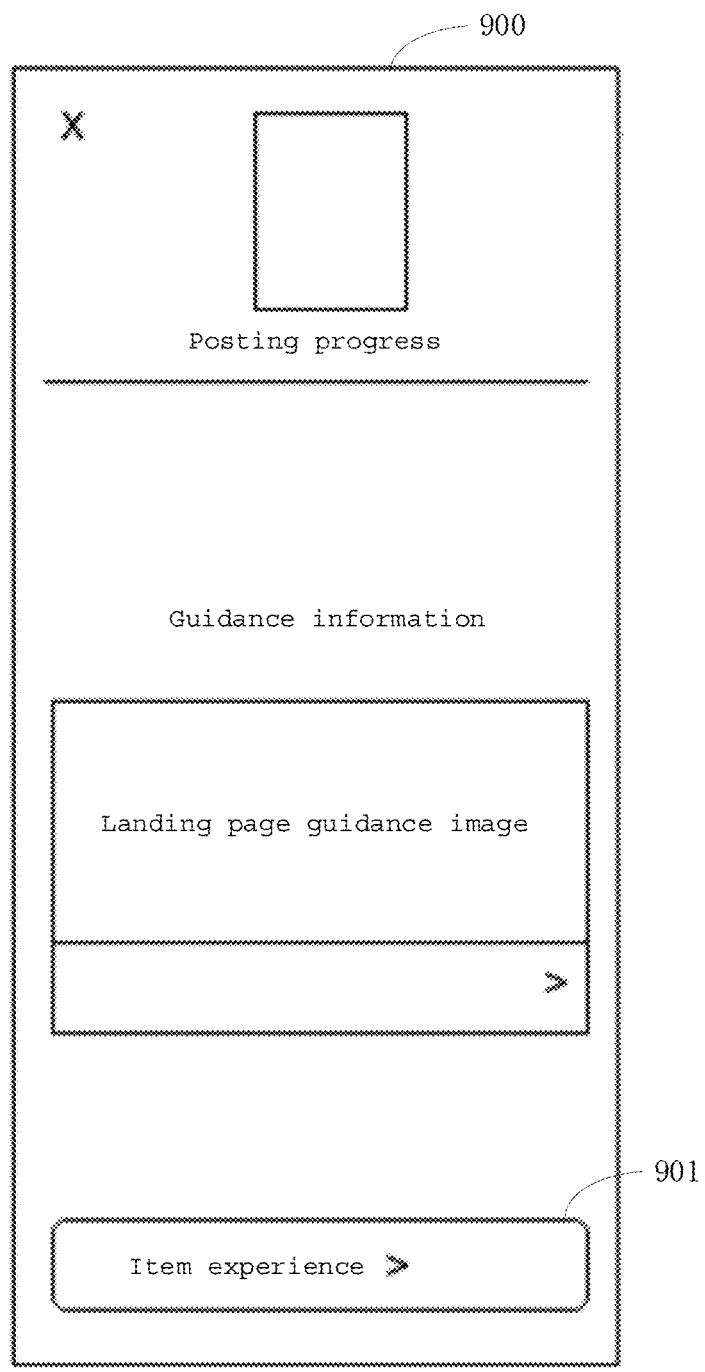
FIG. 9 is a schematic diagram of a posting result page provided in some embodiments of the present disclosure.

For illustration, FIG. 9 is a schematic diagram of a posting result page provided in some embodiments of the present disclosure. As shown in FIG. 9, a posting result page 900 is displayed, which can display a posting progress of the above anchor video to enable the user to understand a progress of a posting operation until the posting is completed. Optionally, the posting result page 900 can also display guidance information related to the target item, and a landing page guidance image, etc., to help the user further understand the target item. Optionally, the posting result page 900 can also display an item experience control 901. After the user triggers the item experience control 901, the user can return to the interactive experience page 300 in FIG. 3.

In the above scheme, after generating a video with an interactive experience effect, the interaction anchor can be add using a video anchor technology when the video is posted by the user, so as to quickly achieve the interactive experience of the same item through the interaction anchor subsequently, increasing item attention and greatly enhancing the user's interactive experience effect.

In some embodiments, the anchor setting control also comprises an associated interaction anchor corresponding to the target interaction anchor, and the interaction method can further comprise, before posting the anchor video in response to the video posting operation: in response to a trigger operation on the associated interaction anchor in the anchor setting control, adding the associated interaction anchor in the anchor video, and obtaining a new anchor video.

An item of the associated interaction anchor can has some identical attribute as an item of the target interaction anchor, such as the same acting areas, types, etc. For example, both a hat and a wig act on a head area, and the associated interaction anchor corresponding to the interaction anchor of the hat can be the interaction anchor of the wig, which is only an example. There is no limit to a quantity of the associated interaction anchors.

The interaction apparatus can obtain the associated interaction anchor corresponding to the target interaction anchor and display the associated interaction anchor in the anchor setting control of the video posting page mentioned above. Before the posting the anchor video in response to the video posting operation, in response to receiving the trigger operation on the associated interaction anchor from the user, the associated interaction anchor can then be added to the anchor video that has been added with the target interaction anchor, a new anchor video that comprises both the target interaction anchor and the associated interaction anchor is obtained, and after that, the new anchor video is posted.

In some embodiments, after the trigger operation on the associated interaction anchor from the user is received, the associated interaction anchor can also be added to the target image or the target shooting video to obtain an anchor video that only comprises the associated interaction anchor and post it. That is to say, the anchor video can comprise the target interaction anchor and/or the associated interaction anchor mentioned above, in particular depending on a decision of the user.

There is no limit to a position of adding the associated interaction anchor, which can be automatically added at a preset position or manually added at a position selected by the user according to the operation of the user. The preset position is not limited, for example, it can be any position in the background area.

Referring to FIG. 8, the anchor setting control 801 can also display the associated interaction anchor "Hat try on" of the target interaction anchor "AR lipstick experience". When the user triggers the associated interaction anchor "Hat try on", this anchor is selected and can be highlighted in bold. The associated interaction anchor is added to the target image or the target shooting video to obtain the anchor video and post it. A posting process is same as that of the target interaction anchor mentioned above.

In some embodiments, the associated interaction anchor can also be independent of the target interaction anchor. For example, the associated interaction anchor can comprise several interaction anchors that have highest historical triggering amount, further expanding an adding scope of interaction anchors.

In the above scheme, when adding the interaction anchor to the target image or the target shooting video, the client can not only add the triggered target interaction anchor, but also can add the associated interaction anchor, and the position of adding the anchors can be automatically or manually selected, making ways of adding the anchors more diverse and more in line with the actual needs of the user, and further improving the interactive experience effect.

It can be understood that before the above step 101, the client can receive the video shooting trigger operation from the user in an initial state, then jump to the video shooting page, shoot the video on the video shooting page based on the real-time image captured by an image acquisition device, and obtain the target shooting video. Afterwards, the client can also perform the video posting, and set the interaction anchor during video posting and at least one interaction anchor at this point can be added according to the user's selection to obtain the anchor video and posts it. The posted anchor video is not just a simple video file, but a video attached with the interaction anchor, through which a user who watch the video can quickly access an interactive experience of an item corresponding to the interaction anchor later in the case where the user is interested in the item, further improving the user's item interactive experience effect and increasing item attention.

Figure 10:
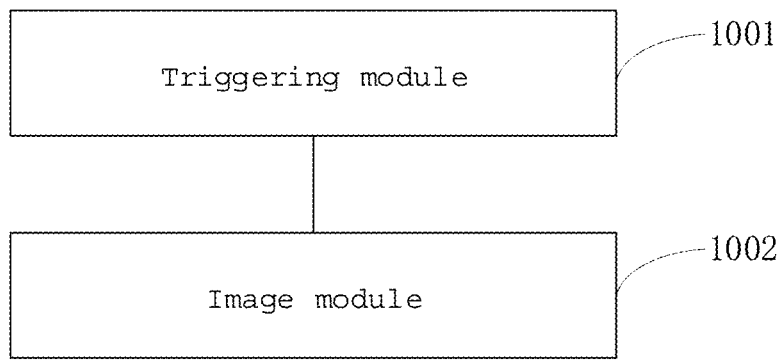
FIG. 10 is a schematic diagram of structure of an interaction apparatus provided in some embodiments of the present disclosure.

FIG. 10 is a schematic diagram of structure of an interaction apparatus provided in some embodiments of the present disclosure, which can be realized by software and/or hardware, and can generally be integrated into an electronic device. As shown in FIG. 10, the apparatus comprises: a triggering module 1001 and an image module 1002.

The trigger module 1001 is configured to: in response to a trigger operation on a target interaction anchor on a video page, obtain an image to be processed and a material of a target item associated with the target interaction anchor.

Image module 1002 is configured to: generate a target image based on the material of the target item and the image to be processed.

In some embodiments, in response to the image to be processed being a real-time shot image, the triggering module 1001 is configured to: activate an interactive virtual camera associated with the target interaction anchor, and obtain the real-time shot image through the interactive virtual camera;
the image module 1002 is specifically configured to: generate a real-time preview image based on the material of the target item and the image to be processed; and take the real-time preview image as the target image, and display the target image in the interactive virtual camera.

In some embodiments, the image module comprises: a first unit, configured to determine a target image area in the image to be processed based on a material type of the material of the target item; a second unit, configured to combine the material of the target item with the target image area in the image to be processed to obtain the target image.

In some embodiments, in response to the material of the target item being a two-dimensional sticker of the target item and the target image area being a portrait area; the second unit is configured to overlay the two-dimensional sticker of the target item on the portrait area in the image to be processed to generate the target image.

In some embodiments, in response to the material of the target item being a three-dimensional model of the target item and the target image area is a body area corresponding to the target item and the second unit is configured to combine the three-dimensional model of the target item with the body area corresponding to the target item in the image to be processed to generate the target image, wherein the body area comprises a head area, a neck area, a limbs area, or a foot area.

In some embodiments, the material of the target item comprises materials of the target item under at least two attributes, and the apparatus further comprises a switching module, configured to after generating the target image based on the material of the target item and the image to be processed: in response to an attribute switching operation of the material of the target item, generate a new target image based on a switched material of the target item and the image to be processed.

In some embodiments, the apparatus further comprises a shooting module, configured to after generating the target image based on the material of the target item and the image to be processed: in response to a video shooting trigger operation, display the target image on a video shooting page; and in response to a shooting operation on the video shooting page, generate a target shooting video corresponding to the target image; alternatively, in response to a photo trigger operation, store the target image as a photo.

In some embodiments, the video shooting page further comprises at least one effect control corresponding to the target item, and the shooting module is configured to in response to the shooting operation and a trigger operation on a target effect control within the at least one effect control, add an effect element corresponding to the target effect control in the target image during a video shooting process, and generate the target shooting video.

In some embodiments, an effect element of each of the at least one effect control corresponding to the target item corresponds to one attribute of the target item, and in response to the target item corresponding to multiple effect controls, attributes of the target item corresponding to effect elements of the multiple effect controls are different, wherein the attributes of the target item comprise at least one of the following: color, size, style, and material.

In some embodiments, the apparatus further comprises a posting module configured to: in response to a video posting trigger operation, display an anchor setting control of the target image on a video posting page; in response to a setting trigger operation on the anchor setting control, add a target interaction anchor corresponding to the target item in the target image, and obtain an anchor video; and in response to a video posting operation, post the anchor video.

In some embodiments, the target interaction anchor is added to a target position, and a distance between the target position and the target item is less than or equal to a preset distance, or the target position is any position in a background area.

In some embodiments, the anchor setting control further comprises an associated interaction anchor corresponding to the target interaction anchor, and the apparatus further comprises an associated interaction anchor module configured to, before posting the anchor video in response to the video posting operation: in response to a trigger operation on the associated interaction anchor in the anchor setting control, add the associated interaction anchor in the anchor video, and obtain a new anchor video.

The interaction apparatus provided in the embodiments of the present disclosure can execute the interaction method provided in any embodiment of the present disclosure, and has corresponding functional modules and beneficial effects for executing the method.

The embodiments of the present disclosure also provide a computer program product, comprising a computer program/instruction that implements the interaction method provided in any embodiment of the present disclosure when executed by a processor.

Figure 11:
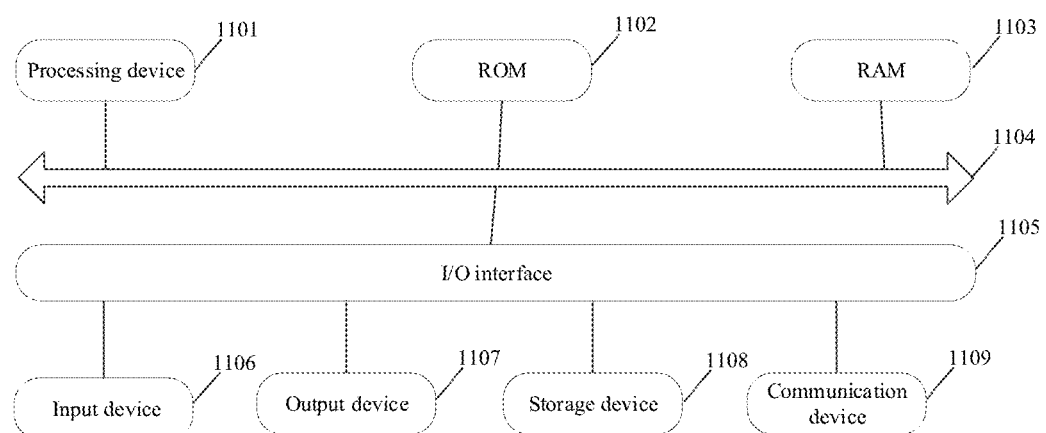
FIG. 11 is a schematic diagram of structure of an electronic device provided in some embodiments of the present disclosure.

FIG. 11 is a schematic diagram of structure of an electronic device provided in embodiments of the present disclosure. Referring to FIG. 11 in particular, it illustrates a schematic diagram of the structure that is suitable for realizing the electronic device 1100 in the embodiments of the present disclosure. The electronic device 1100 in the embodiments of the present disclosure can comprise, but not limited to, mobile terminals such as mobile phone, laptop computer, digital broadcasting receiver, PDA (Personal Digital Assistant), PAD (tablet computer), PMP (Portable Multimedia Player), vehicle-mounted terminal (e.g. vehicle-mounted navigation terminal), etc., and fixed terminals such as digital TV, desktop computer, etc. The electronic device shown in FIG. 11 is only an example and should not impose any limitations on the functions and usage scope of the embodiments of the present disclosure.

As shown in FIG. 11, the electronic device 1100 can comprise a processing device (e.g. central processing unit, graphics processor, etc.) 1101, which can perform various appropriate actions and processes according to programs stored in a Read-Only Memory (ROM) 1102 or programs loaded from a storage device 1108 into a Random Access Memory (RAM) 1103. In the RAM 1103 are also stored various programs and data required for operations of the electronic device 1100. The processing device 1101, ROM 1102, and RAM 1103 are connected to each other through a bus 1104. An input/output (I/O) interface 1105 is also connected to the bus 1104.

Typically, the following devices can be connected to the I/O interface 1105: an input devices 1106 comprising: for example, touch screen, touchpad, keyboard, mouse, camera, microphone, accelerometer, gyroscope, etc.; an output device 307 comprising: for example, liquid crystal display (LCD), speaker, vibrator, etc.; Including output devices such as liquid crystal displays (LCDs), speakers, vibrators, etc. 1107; a storage device 1108 comprising: for example, magnetic tape, hard disk, etc.; and a communication device 1109. The communication device 1109 can allow the electronic device 1100 to communicate wirelessly or wired with other equipment to exchange data. Although FIG. 11 illustrates the electronic device 1100 with various devices, it should be understood that it is not required to implement or have all the shown devices. More or fewer devices can be implemented or included as an alternative.

Specifically, according to the embodiments of the present disclosure, the process described above with reference to the flowchart can be realized as a computer software program. For example, the embodiments of the present disclosure comprise a computer program product, which comprises a computer program carried on a non-transient computer-readable medium, wherein the computer program comprises program codes for executing the method shown in the flowchart. In such embodiments, the computer program can be downloaded and installed from network through the communication device 1109, or installed from the storage device 1108, or installed from the ROM 1102. When the computer program is executed by the processing device 1101, the above functions defined in the interaction method of the embodiments of the present disclosure are performed.

It should be noted that the above computer-readable medium mentioned in the present disclosure can be a computer-readable signal medium, a computer-readable storage medium, or any combination of both. The computer-readable storage medium, for example, can be, but not limited to, an electrical, magnetic, optical, electromagnetic, infrared, or semiconductor system, device, or component, or any combination thereof. More specific examples of the computer-readable storage medium may comprise, but not limited to: electrical connection with one or more wires, portable computer disk, hard disk, Random Access Memory (RAM), Read-Only Memory (ROM), Erasable Programmable Read-Only Memory (EPROM or flash), fiber optic, Portable Compact Disk Read-Only Memory (CD-ROM), optical storage device, magnetic storage device, or any suitable combination thereof. In the present disclosure, the computer-readable storage medium can be any tangible medium containing or storing a program, which can be used by an instruction execution system, device, or component, or in combination with the same. While in the present disclosure, the computer-readable signal medium can comprise data signals propagated in the baseband or as a part of the carrier wave, which carry computer-readable program codes. This type of propagated data signals can take various forms, comprising but not limited to electromagnetic signal, optical signal, or any suitable combination thereof. The computer-readable signal medium can also be any computer-readable medium other than the computer-readable storage medium, which can send, propagate, or transmit a program used by or in combination with the instruction execution system, device, or component. The program codes contained in the computer-readable medium can be transmitted using any appropriate medium, comprising but not limited to: wire, optical cable, RF (Radio Frequency), etc., or any suitable combination thereof.

In some implementations, client and server can communicate using any currently known or future developed network protocol, such as HTTP (HyperText Transfer Protocol), and can interconnect with any form or medium of digital data communication (such as communication network). Examples of the communication network comprise Local Area Network ("LAN"), Wide Area Network ("WAN"), internet (for example, the Internet), and end-to-end network (for example, ad hoc end-to-end network), as well as any currently known or future developed network.

The computer-readable medium mentioned above can be included in the aforesaid electronic device; it can also exist separately without being assembled into the electronic device.

The computer-readable medium mentioned above carries one or more programs, which, when executed by the electronic device, enable the electronic device to: in response to a trigger operation on a target interaction anchor on a video page, obtain an image to be processed and a material of a target item associated with the target interaction anchor; and generate a target image based on the material of the target item and the image to be processed.

The computer program codes for executing operations of the present disclosure may be written in one or more programming languages or combinations thereof, comprising, but not limited to, object-oriented programming languages such as Java, Smalltalk, C++, and conventional procedural programming languages such as C or similar programming languages. The program codes can be completely executed on a user's computer, partially executed on a user's computer, executed as an independent software package, partially executed on a user's computer and partially executed on a remote computer, or completely executed on a remote computer or server. In the case involving a remote computer, the remote computer can connect to the user's computer through any type of network (comprising Local Area Network (LAN) or Wide Area Network (WAN)), or can connect to an external computer (e.g. connect via the Internet using an Internet service provider).

The flowchart and block diagram in the accompanying drawings illustrate the possible architecture, functions, and operations of the system, method, and computer program product according to various embodiments of the present disclosure. At this point, each box in the flowchart or block diagram can represent a module, program segment, or part of codes that includes one or more executable instructions for realizing a specified logical function. It should also be noted that in some alternative implementations, the functions indicated in the box can also occur in a different order than those indicated in the accompanying drawings. For example, two consecutive boxes can actually be executed in basically parallel, and sometimes they can also be executed in reverse order, depending on the function involved. It should also be noted that each box in the block diagram and/or flowchart, as well as the combination of boxes in the block diagram and/or flowchart, can be realized using a dedicated hardware based system that executes specified functions or operations, or can be realized using a combination of dedicated hardware and computer instructions.

The involved units described in the embodiments of the present disclosure can be realized in form of software or in form of hardware. Wherein, name of the unit does not constitute a limitation on the unit itself in a certain situation.

The above functions described herein can be at least partially executed by one or more hardware logic components. For example, non-restrictively, demonstration types of the hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), and the like.

In the context of the present disclosure, a machine readable medium can be a tangible medium that can include or store a program that can be used by an instruction execution system, device, or equipment or in combination with an instruction execution system, device, or equipment. The machine readable medium can be a machine readable signal medium or a machine readable storage medium. The machine readable medium can comprise but not limited to an electronic, magnetic, optical, electromagnetic, infrared, or semiconductor system, device, or equipment, or any suitable combination thereof. More specific examples of the machine readable storage medium can comprise electrical connection based on one or more wires, portable computer disk, hard disk, Random Access Memory (RAM), Read-Only Memory (ROM), Erasable Programmable Read-Only Memory (EPROM or flash memory), optical fiber, Compact Disc Read-Only Memory (CD-ROM), optical storage device, magnetic storage device, or any suitable combination thereof.

The above description is only for explaining the preferred embodiments of the present disclosure and the technical principles used. Those skilled in the art should understand that the scope of disclosure involved in the present disclosure is not limited to technical solutions formed by specific combinations of the aforementioned technical features, and should also cover other technical solutions formed by arbitrary combination of the aforementioned technical features or their equivalent features when not departing from the disclosed concept. For example, a technical solution formed by exchanging the above features with (but not limited to) the technical features with similar functions disclosed in the present disclosure.

Furthermore, although the operations are depicted in a specific order, this should not be understood as requiring them to be executed in the specific order shown or in sequential order. In certain environments, multitasking and parallel processing may be advantageous. Similarly, although several specific implementation details are included in the above discussion, these should not be construed as limitations on the scope of the present disclosure. Some features described in the context of individual embodiments can also be combined to be implemented in a single embodiment. On the contrary, various features described in the context of a single embodiment can also be implemented separately or in multiple embodiments in any suitable manner of sub-combination.

Although the subject matter has been described in language specific to structural features and/or method logical actions, it should be understood that the subject matter defined in the attached claims may not necessarily be limited to the specific features or actions described above. On the contrary, the specific features and actions described above are only exemplary forms of implementing the claim.

What is claimed is:

1. An interaction method, comprising:
   in response to a trigger operation on a target interaction anchor on a video page, obtaining an image to be processed and a material of a target item associated with the target interaction anchor;
   generating a target image based on the material of the target item and the image to be processed;
   in response to a video shooting trigger operation, displaying the target image on a video shooting page;
   in response to a shooting operation on the video shooting page, generating a target shooting video corresponding to the target image;
   in response to a posting trigger operation, displaying an anchor setting control of the target shooting video on a video posting page;
   in response to a setting trigger operation on the anchor setting control, adding a target interaction anchor corresponding to the target item in the target shooting video, and obtaining an anchor video; and
   in response to a video posting operation, posting the anchor video.

2. The interaction method according to claim 1, wherein:
   in response to the image to be processed being a real-time shot image, the obtaining the image to be processed comprises:
   activating an interactive virtual camera associated with the target interaction anchor, and obtaining the real-time shot image through the interactive virtual camera; and
   the generating the target image based on the material of the target item and the image to be processed comprises:
   generating a real-time preview image based on the material of the target item and the image to be processed; and
   taking the real-time preview image as the target image, and displaying the target image in the interactive virtual camera.

3. The interaction method according to claim 2, further comprising, after generating the target image based on the material of the target item and the image to be processed:
   in response to a photo trigger operation, storing the target image as a photo.

4. The interaction method according to claim 1, wherein the generating the target image based on the material of the target item and the image to be processed comprises:
   determining a target image area in the image to be processed based on a material type of the material of the target item; and
   combining the material of the target item with the target image area in the image to be processed to obtain the target image.

5. The interaction method according to claim 4, wherein in response to the material of the target item being a two-dimensional sticker of the target item and the target image area being a portrait area, the combining the material of the target item with the target image area in the image to be processed to obtain the target image comprises:
   overlaying the two-dimensional sticker of the target item on the portrait area in the image to be processed to generate the target image.

6. The interaction method according to claim 4, wherein in response to the material of the target item being a three-dimensional model of the target item and the target image area is a body area corresponding to the target item, and the combining the material of the target item with the target image area in the image to be processed to obtain the target image comprises:
   combining the three-dimensional model of the target item with the body area corresponding to the target item in the image to be processed to generate the target image, wherein the body area comprises a head area, a neck area, a limbs area, or a foot area.

7. The interaction method according to claim 1, wherein the material of the target item comprises a plurality of materials of the target item under at least two attributes, and the interaction method further comprises, after generating the target image based on the material of the target item and the image to be processed:
in response to an attribute switching operation of the material of the target item, generating a new target image based on a switched material of the target item and the image to be processed.

8. The interaction method according to claim 1, wherein the video shooting page further comprises at least one effect control corresponding to the target item, and the interaction method comprising: in response to the shooting operation and a trigger operation on a target effect control within the at least one effect control, adding an effect element corresponding to the target effect control in the target image during a video shooting process, and generating the target shooting video.

9. The interaction method according to claim 8, wherein an effect element of each of the at least one effect control corresponding to the target item corresponds to one attribute of the target item, and in response to the target item corresponding to multiple effect controls, attributes of the target item corresponding to effect elements of the multiple effect controls are different, wherein the attributes of the target item comprise at least one of the following: color, size, style, and material.

10. The interaction method according to claim 1, further comprising:
in response to the posting trigger operation, displaying the anchor setting control of the target image on the video posting page;
in response to the setting trigger operation on the anchor setting control, adding the target interaction anchor corresponding to the target item in the target image, and obtaining the anchor video; and
in response to the video posting operation, posting the anchor video.

11. The interaction method according to claim 10, wherein the target interaction anchor is added to a target position, and a distance between the target position and the target item is less than or equal to a preset distance, or the target position is any position in a background area.

12. The interaction method according to claim 10, wherein the anchor setting control further comprises an associated interaction anchor corresponding to the target interaction anchor, and the interaction method further comprises, before posting the anchor video in response to the video posting operation:
in response to a trigger operation on the associated interaction anchor in the anchor setting control, adding the associated interaction anchor in the anchor video, and obtaining a new anchor video.

13. The interaction method according to claim 10, further comprising:
displaying at least one of a guidance information entry, a landing page guidance image, or an item experience control related to the target item, on a posting result page; and
in response to triggering of the item experience control, returning to an interactive experience page, wherein the interactive experience page comprises the target image.

14. The interaction method according to claim 1, wherein the video shooting page further comprises an item experience control, and the interaction method further comprising:
in response to triggering of the item experience control, returning to an interactive experience page, wherein the interactive experience page comprises the target image.

15. An electronic device, wherein the electronic device comprises:
a processor;
a memory for storing executable instructions of the processor,
wherein the processor is configured to read the executable instructions from the memory and executing the executable instructions to:
in response to a trigger operation on a target interaction anchor on a video page, obtain an image to be processed and a material of a target item associated with the target interaction anchor;
generate a target image based on the material of the target item and the image to be processed;
in response to a video shooting trigger operation, display the target image on a video shooting page;
in response to a shooting operation on the video shooting page, generate a target shooting video corresponding to the target image;
in response to a posting trigger operation, display an anchor setting control of the target shooting video on a video posting page;
in response to a setting trigger operation on the anchor setting control, add a target interaction anchor corresponding to the target item in the target shooting video, and obtain an anchor video; and
in response to a video posting operation, post the anchor video.

16. The electronic device according to claim 15, wherein:
in response to the image to be processed being a real-time shot image, the obtaining the image to be processed comprises:
activating an interactive virtual camera associated with the target interaction anchor, and obtaining the real-time shot image through the interactive virtual camera; and
the generating the target image based on the material of the target item and the image to be processed comprises:
generating a real-time preview image based on the material of the target item and the image to be processed; and
taking the real-time preview image as the target image, and displaying the target image in the interactive virtual camera.

17. The electronic device according to claim 15, wherein the generating the target image based on the material of the target item and the image to be processed comprises:
determining a target image area in the image to be processed based on a material type of the material of the target item; and
combining the material of the target item with the target image area in the image to be processed to obtain the target image.

18. A non-transitory computer-readable storage medium, wherein the non-transitory computer-readable storage medium stores a computer program, which when executed by a processor, cause the processor to:
in response to a trigger operation on a target interaction anchor on a video page, obtain an image to be processed and a material of a target item associated with the target interaction anchor;

generate a target image based on the material of the target item and the image to be processed;

in response to a video shooting trigger operation, display the target image on a video shooting page;

in response to a shooting operation on the video shooting page, generate a target shooting video corresponding to the target image;

in response to a posting trigger operation, display an anchor setting control of the target shooting video on a video posting page;

in response to a setting trigger operation on the anchor setting control, add a target interaction anchor corresponding to the target item in the target shooting video, and obtain an anchor video; and in response to a video posting operation, post the anchor video.

19. The non-transitory computer-readable storage medium according to claim 18, wherein:

in response to the image to be processed being a real-time shot image, the obtaining the image to be processed comprises:

activating an interactive virtual camera associated with the target interaction anchor, and obtaining the real-time shot image through the interactive virtual camera; and the generating the target image based on the material of the target item and the image to be processed comprises:

generating a real-time preview image based on the material of the target item and the image to be processed; and taking the real-time preview image as the target image, and displaying the target image in the interactive virtual camera.

20. The non-transitory computer-readable storage medium according to claim 18, wherein the generating the target image based on the material of the target item and the image to be processed comprises:

determining a target image area in the image to be processed based on a material type of the material of the target item; and combining the material of the target item with the target image area in the image to be processed to obtain the target image.

* * * * *